E. JENSEN.
REMOVABLE METAL TIRE FOR VEHICLE WHEELS.
APPLICATION FILED MAY 28, 1917.
1,281,166.
Patented Oct. 8, 1918.
2 SHEETS—SHEET 1.
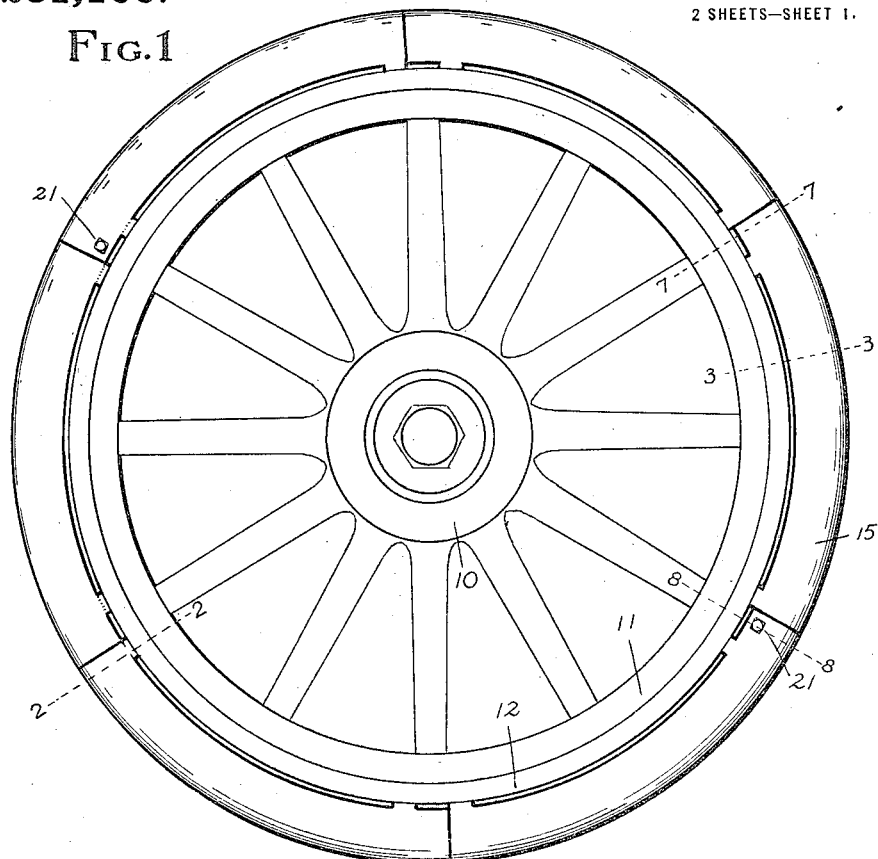
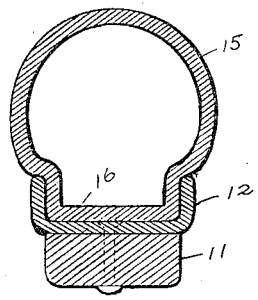
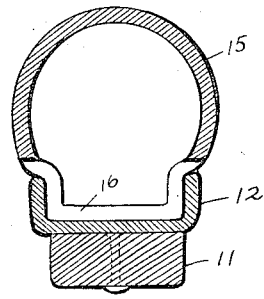
Inventor
Engebret Jensen
By Lockwood & Lockwood,
Attorney E. JENSEN.
REMOVABLE METAL TIRE FOR VEHICLE WHEELS.
APPLICATION FILED MAY 28, 1917.

1,281,166.

Patented Oct. 8, 1918.
2 SHEETS—SHEET 2.

Inventor
Engebret Jensen
By Lockwood & Lockwood
Attorney

UNITED STATES PATENT OFFICE.

ENGEBRET JENSEN, OF WHEATFIELD, INDIANA.

REMOVABLE METAL TIRE FOR VEHICLE-WHEELS.

1,281,166.  Specification of Letters Patent.  Patented Oct. 8, 1918.

Application filed May 28, 1917. Serial No. 171,543.

*To all whom it may concern:*

Be it known that I, ENGEBRET JENSEN, a citizen of the United States, and a resident of Wheatfield, county of Jasper, and State of Indiana, have invented a certain new and useful Removable Metal Tire for Vehicle-Wheels; and I do hereby declare that the following is a full, clear, and exact description thereof, reference being had to the accompanying drawings, in which like letters refer to like parts.

The object of this invention is to provide a portable and removable metal tire for vehicle wheels particularly automobile wheels, for use in emergencies as temporary substitutes for pneumatic rubber tires when the latter have been injured by puncture or "blowout". When such accident happens with a pneumatic tire the injured pneumatic tire is removed and the sectional metal tire is put in its place and used until the pneumatic tire can be taken to a shop or elsewhere to be repaired.

Therefore, this metal emergency tire will do away with the necessity of carrying any extra tire or wheel in the automobile, as is now the general practice. This sectional metal tire can be carried under the seat or in any obscure place, the expense of extra tires and the annoyance and ugliness as in automobiles today being dispensed with.

The chief feature of the invention consists in making a metal tire in sections preferably uniform in length which are adapted to be readily coupled together around the metal rim of the wheel in lieu of the rubber tire. The metal sections are made as light as practical and so as to fit in the metal rim or on the wheel and can be readily coupled and uncoupled and while being coupled the sections are drawn tightly together to prevent rattling or dislocation of the metal tire.

Figure 4:
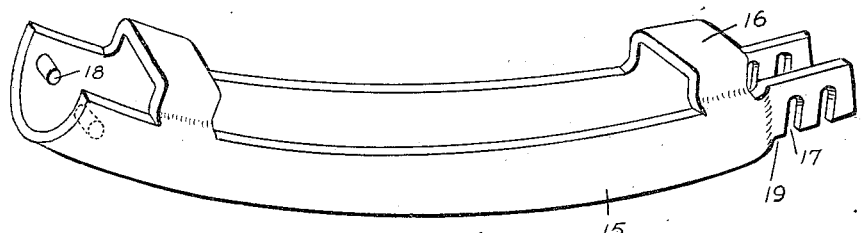
Figure 5:
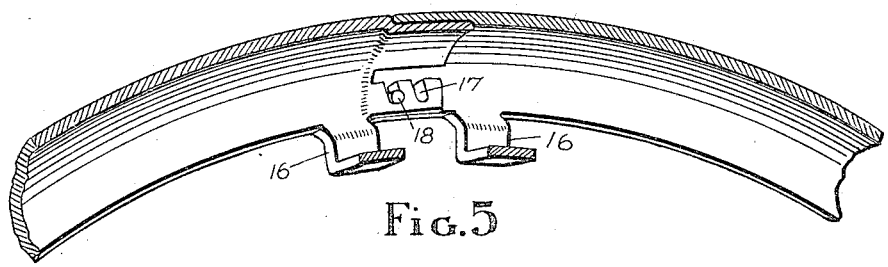
Figure 6:
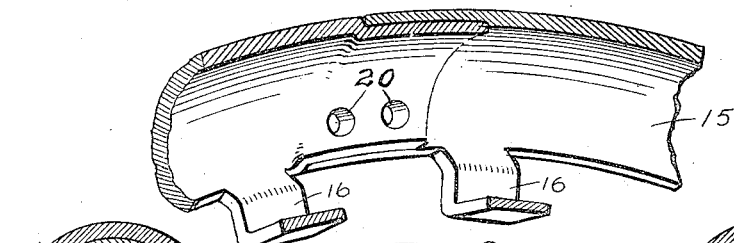
Figure 7:
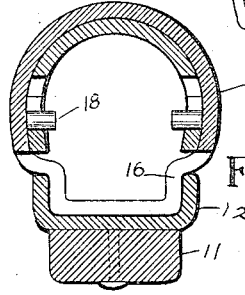
Figure 8:
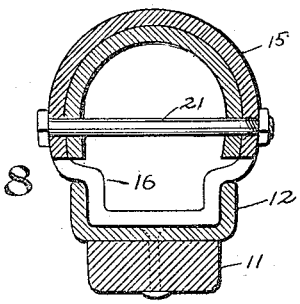

The full nature of the invention will be understood from the accompanying drawings and the following description and claims:

Figure 1 is a side elevation of a wheel showing my improved device attached thereto. Fig. 2 is an enlarged sectional view thereof as seen on line 2—2 of Fig. 1. Fig. 3 is a similar view shown on line 3—3 of Fig. 1. Fig. 4 is a perspective view of one of the sections of my improved tire construction. Fig. 5 is a sectional perspective view longitudinally of the tire. Fig. 6 is a similar view showing a different means for attaching the ends of the sections together. Fig. 7 is an enlarged sectional view as seen on line 7—7 of Fig. 1. Fig. 8 is a similar view as seen on line 8—8 of Fig. 1.

There is shown herein an automobile wheel of common type having a hub 10, a felly 11 and metal rim 12 constructed in any well known manner so as to have a channel for the rubber tire not shown.

The emergency tire is formed of sections 15 segmental longitudinally. There are preferably six of these sections of equal length substantially circular in cross section also the transverse form thereof should be such as to adapt it for use as a tire. Each section has a plurality of inwardly extending tire supports 16 preferably integral with the sections as shown. There are preferably three of these to each section, one near the end and one near the middle thereof. In cross section these tire supports are U-shaped, the width of the inner portion thereof being exactly the same as the width of the channel in the metal rim of the wheel so as to fit snugly therein and hold the tire sections 15 in place on the wheel and from any lateral movement.

Most of the sections 15 are formed as shown in Fig. 4, with a plurality of outwardly opening notches 17 in each side of the tire section adapted to receive the lugs 18 at the end of an adjacent tire section. These lugs extend inwardly from the inner wall of the end of the section of the tire rim which is not notched or slotted. There is a pair of these lugs at such end of each tire section which project toward each other. One end of each section and preferably the end which has the slot 17 has its periphery depressed at 19 so that it will enter the end of the adjacent section with which it is coupled and its periphery lies under or within the periphery of the end of the adjacent section so that the end of one section will overlap the end of the other section. The slotted end of each section is reduced in width or its side walls overlap so as to enter and couple with the end of the adjacent section.

All of the joints of the sections are preferably formed in the manner above described excepting two diametrically disposed joints as shown in Fig. 1. In those two joints, instead of the slot 17, there are holes 20 through which bolts 21 are inserted. There are a plurality of these holes 20 just as there is a plurality of notches 17 for the purpose of adapting the tire for wheels of slightly varying diameters.

When the rubber tire is removed from the wheel the sections 15 of the metal tire are coupled together and one of the bolts 21 put in place so that the metal tire will be complete excepting the opposite bolted joint not yet being coupled. The metal tire is then put in the channel of the metal rim 12 of the wheel and by a suitable tool the uncoupled ends of the metal tire are drawn tightly toward each other and then bolt 21 inserted. This secures the metal tire on the wheel. When the automobile is equipped with this emergency tire it can be driven and used until the rubber or pneumatic tire is replaced. This will make it needless to carry any extra tire or wheel on the automobile and also will make it needless to travel with a deflated tire so as to cut out and ruin the rim and inner tube thereof. The sectional metal tire when removed from the wheel is disassembled and placed in the tool box or other appropriate place in the automobile out of the way and out of sight. While the sections of the metal tire are shown solid that is, however, unnecessary, as it is desired to make them as light as possible so that they will do their work.

The invention claimed is:

1. A removable metal tire for vehicle wheels, which tire is formed of segmental sections, one end of each section having slots, pins on the adjacent end of the next section for engagement with said slots for locking the sections together, each section having a tread portion semi-circular in cross section and inwardly extending supports integral with the edges of the segmental sections adapted to fit on the wheel and space the tire therefrom.

2. The combination with a vehicle wheel having a channel rim, of a metal tire composed of segmental sections, said sections having slots at one end, pins at the opposite ends of said sections adapted to interlock with said slots, whereby said sections may be coupled or uncoupled at their adjacent ends, each section having a tread portion semi-circular in cross section, and substantially U-shaped supports extending inwardly from and integral with the tread sections adapted to fit snugly in the channel of the wheel rim.

3. A metal tire for vehicle wheels which tire is formed of segmental sections, one end of a section having outwardly opening slots in the side walls thereof and the other end of the section having transversely extending lugs adapted to enter said slots and one end of each section being reduced so as to fit within and be overlapped by the end of the adjacent section.

4. A metal tire for vehicle wheels which tire is formed of segmental sections, one end of a section having outwardly opening slots in the side walls thereof and the other end of the section having transversely extending lugs adapted to enter said slots and one end of each section being reduced so as to fit within and be overlapped by the end of the adjacent section, the ends of one or more sections in said tire having holes instead of slots and bolts adapted to be inserted through said holes for coupling the adjacent sections together.

In witness whereof, I have hereunto affixed my signature.

ENGEBRET JENSEN.

Copies of this patent may be obtained for five cents each, by addressing the "Commissioner of Patents, Washington, D. C."